United States Patent
Simons

(10) Patent No.: US 7,835,732 B2
(45) Date of Patent: Nov. 16, 2010

(54) CONSENSUAL SERVICE REGISTRATION AND DELIVERY

(75) Inventor: Paul R. Simons, Redhill (GB)

(73) Assignee: Koninklijke Philips Electronics N. V., Eindhoven (NL)

( * ) Notice: Subject to any disclaimer, the term of this patent is extended or adjusted under 35 U.S.C. 154(b) by 1551 days.

(21) Appl. No.: 10/213,421

(22) Filed: Aug. 6, 2002

(65) Prior Publication Data

US 2003/0045280 A1    Mar. 6, 2003

(30) Foreign Application Priority Data

Sep. 6, 2001    (GB)    ................... 0121506.0

(51) Int. Cl.
 H04W 4/00    (2009.01)
 H04W 24/00    (2009.01)
 H04B 1/00    (2006.01)

(52) U.S. Cl. ................. 455/422.1; 455/435.1; 455/63.4; 455/456.3

(58) Field of Classification Search .............. 455/456.1, 455/422.1, 435.1, 435.2, 41.2, 63.4, 456.3; 348/207.1
See application file for complete search history.

(56) References Cited

U.S. PATENT DOCUMENTS

| | | | | |
|---|---|---|---|---|
| 4,941,207 A * | 7/1990 | Maeda et al. | ................. | 398/119 |
| 5,566,022 A * | 10/1996 | Segev | .......................... | 398/107 |
| 5,815,811 A | 9/1998 | Pinard et al. | .................. | 455/434 |
| 6,006,158 A * | 12/1999 | Pilley et al. | .................. | 701/120 |
| 6,256,046 B1 * | 7/2001 | Waters et al. | ................. | 345/473 |
| 6,332,098 B2 * | 12/2001 | Ross et al. | .................... | 700/226 |
| 6,487,180 B1 * | 11/2002 | Borgstahl et al. | ............ | 370/310 |
| 6,490,455 B1 * | 12/2002 | Park et al. | ................. | 455/456.4 |
| 6,615,048 B1 * | 9/2003 | Hayashi | ..................... | 455/456.3 |
| 6,737,986 B2 * | 5/2004 | Fuyama | ...................... | 340/928 |
| 6,745,037 B1 * | 6/2004 | Neumann et al. | ......... | 455/456.1 |
| 6,813,608 B1 * | 11/2004 | Baranowski | .................... | 705/6 |
| 6,889,054 B2 * | 5/2005 | Himmel et al. | ........... | 455/456.3 |
| 2002/0176003 A1 * | 11/2002 | Seder et al. | .............. | 348/207.1 |

FOREIGN PATENT DOCUMENTS

| | | |
|---|---|---|
| EP | 1054570 A1 | 11/2000 |
| GB | 2234636 A | 2/1991 |
| GB | 2356726 A | 5/2001 |
| JP | 11178052 A | 7/1999 |
| JP | 2001119761 A | 4/2001 |
| WO | 9106926 | 5/1991 |
| WO | WO 9106926 | 5/1991 |
| WO | WO 9906928 | 2/1999 |
| WO | 9955102 | 10/1999 |
| WO | WO 9955102 | 10/1999 |
| WO | WO 0133901 | 5/2001 |

* cited by examiner

*Primary Examiner*—Un C Cho

(57) ABSTRACT

A communications system is described wherein consensual push of services from radio beacons (30, 32, 33) to a user's portable device (14) is enabled. The consent process comprises a user registering the portable device (14) at a registration beacon (30) to consent to data delivery from other relevant beacons (32, 33) in a network. The registration beacon (30) has a broadcast range which is constrained within, and highlighted to a user as, an indicated interaction zone (16). The range is preferably constrained and highlighted using electromagnetic shielding (18), or by using a directional antenna, or a combination of both. In use, the user must position their portable device (14) within the indicated interaction zone (16) to register for service delivery.

21 Claims, 4 Drawing Sheets

CONSENSUAL SERVICE REGISTRATION AND DELIVERY

FIELD OF INVENTION

The present invention relates to services offered to users of electronic equipment, especially but not exclusively to users of mobile communications devices such as portable telephones and suitably equipped PDA's (personal digital assistants). The invention further relates to a method and apparatus for delivery of such services.

BACKGROUND TO INVENTION

Recent years have seen a great increase in subscribers world-wide to mobile telephone networks and, through advances in technology and the addition of functionalities, cellular telephones have become personal, trusted devices. A result of this is that a mobile information society is developing, with personalised and localised services becoming increasingly more important. Such "Context-Aware" (CA) mobile telephones are used with low power, short range base stations in places like shopping malls or airports to provide location-specific information. This information might include information on nearby shops and restaurants, flight gate number and check-in time and so on. The user's CA terminal may be equipped to filter the information received according to pre-stored user preferences and the user is only alerted if an item of data of particular interest has been received.

However, the "Pushing" (unsolicited delivery) of information over RF, IR or wide-area networks to mobile phone or PDA devices requires prior consent and optionally further selection through profiling for it to be accepted by (or acceptable to) consumers. Unsolicited, 'junk' alerts and offers will quickly be rejected.

The consent process itself, however, involving interaction with a central system, either beforehand or at the place where the push is to be delivered, and selection, plus a declaration of the user's handset identity, may entail prohibitive effort on the part of the casual user. Alternatively, filters may be activated by the user on their handset to block unwanted categories of pushed electronic offers. This may require user deliberations and effort to select the right personal filters for the place they are entering. An inefficient system may result which generates pushed offers and signals that are destined to be blocked by all of the users who are present in the locale.

A system which addresses the aforementioned problem of unsolicited push is described in the commonly assigned United Kingdom patent application no. 0113629.0 entitled 'Consensual Data Delivery Through Beacons' (Agents Ref. PHGB010086) filed Jun. 5, 2001 and unpublished at the priority date of the present application. The system provides a communications system comprising first and second beacon devices capable of wireless message transmission and at least one portable device capable of receiving such message transmissions, wherein said first beacon is arranged to broadcast a series of inquiry messages over a first broadcast range and according to a first communications protocol, wherein said at least one portable device is arranged to detect such inquiry messages when within said first broadcast range and reply with an identifier for the portable device, wherein said first beacon device is arranged to transmit a received identifier to said second beacon, wherein said second beacon and portable device are configured to perform a service interaction when the portable device is within a second broadcast range of the second beacon and when triggered by the second beacon receiving the portable device identifier, and wherein at least one of the first and second broadcast ranges is a relatively short broadcast range.

This system has the advantage that at least one of the beacons has a short broadcast range, necessitating the physical movement of a user towards a beacon to register their portable device for data delivery, thereby providing some user control over the "Push" process. However, the beacon broadcast range, although short in comparison with other broadcast ranges, is unconstrained and may therefore overlap with other beacons installed into the system at a later date, the latter also offering service interaction thereby leading to unwanted service delivery. Additionally, the lack of physical indication of the broadcast range can lead to confusion for the user, who may be unsure of not only where the beacons are, but also unsure of the required proximity required between their portable device and a beacon in order to enable service interaction.

OBJECT OF INVENTION

It is accordingly an object of the present invention to provide a communication system for providing interactive services via a beacon whereby user selection of services is accomplished in a relatively simple manner.

SUMMARY OF INVENTION

In accordance with the present invention there is provided a communications system comprising a beacon device for providing interactive services, the beacon device capable of wireless transmissions according to a communications protocol over a broadcast range, and at least one portable device capable of receiving said transmissions according to said protocol, wherein said beacon broadcast range is constrained substantially within an indicated interaction zone and where in use said portable device is required to be positioned within said indicated interaction zone of said beacon to receive said transmissions.

A beacon has a broadcast range typically dependent upon the power of the beacon. The range usually covers a uniform circular area of a certain radius surrounding the beacon, for example 10 m. This range is considered herein as the natural, or unconstrained range of the beacon. Conversely, this invention constrains such a range substantially within an indicated interaction zone, such that the broadcast range of the beacon covers an area smaller than that covered by the beacon in an unconstrained state.

The use of an indicated interaction zone, preferably a coloured booth within which the broadcast range of the beacon is constrained, or a wall and or floor surface marked with arrows and or signs indicating the constrained range of the relevant beacon will mean that a user can choose to interact or register for a service simply by ensuring their portable device is positioned within the highlighted interaction zone.

The use of bright colours and or company logos and shaped surfaces around and to form the interaction zone will mean that a user can quickly spot which beacons to approach for interaction or which beacons to stay away from should the user not wish to interact, whilst allowing companies to leverage brand values to their advantage. Furthermore, constraining the broadcast range of the beacon reduces the risk that the broadcast will interfere with another beacon broadcast, and indicating separate interaction zones for each beacon empowers a user in their choice of which services to interact with whilst reducing the risk of accidentally registering for another beacon's service offer.

In one embodiment the broadcast range is constrained by the use of electromagnetic shielding within, or at the boundaries of, the indicated interaction zone. Preferably, glass, plastic or metal walls surrounding the beacon may have an embedded metal grid to absorb the broadcasted transmissions thereby constraining them within the area enclosed by the walls.

The formation of an environment surrounding a beacon comprising physical and/or visual indicator means to identify the limits of an interaction zone is, in one embodiment, advantageously achieved using such shielded walls, the limits of the interaction zone being identified with and subject to the exact shape and configuration of the walls.

In another embodiment of the present invention, shielded walls may form a kiosk or booth around the beacon, said walls having brightly painted or coloured surfaces to delineate the interaction, zone from the general surroundings thereby rendering the interaction zone obvious to a customer.

In another embodiment of the present invention, the beacon may be located within a suitably shielded and highlighted booth or kiosk, the interaction zone being indicated visually on the walls or the floor of the booth or kiosk.

In another embodiment the broadcast range of the beacon is constrained by deliberately using a short range low power beacon. The combination of such beacons with a shielded environment, for example embedding and indicating a beacon with a range of 10 cm in a wall advantageously enables the co-existence of many beacons in a small area, without creating overlapping broadcast ranges. Hence, a central registration point in an airport may comprise several beacons located a few meters apart, each beacon residing within a tray or table marked and highlighted with service offerings and an indicated interaction zone not extending substantially beyond the confines of the tray or table.

Alternatively, the beacon may have an adjustable broadcast range which is adjusted to comply with an indicated interaction zone surrounding the beacon.

Advantageously, the broadcast range may be constrained directionally with the use of a directional antenna. A combination of short range beacon with a directional antenna constrains the broadcast range within a small, fixed volume of space. For example, as will be described in further detail, an interaction zone extending only a few cm's from a wall or an interaction zone confined substantially within a tray or recess within a table can be obtained with a directional antenna such as a microstrip patch antenna and suitable shielding combination, necessitating the user of a portable device to swipe their device across the indicated area of a wall or drop their device into a service registration tray or access point to indicate their consent to service delivery.

The act of consensual service interaction signified by a customer's portable device being swiped, dropped/placed, or simply moved through an indicated interaction zone may further comprise an audible alert to reassure the customer and indicate that interaction is occurring, or was successful.

In a further embodiment, the system comprises a network of beacons and a portable device, the beacons able to communicate among themselves via an interconnection which may be a fixed part of the network infrastructure, or may be provided by a wide area wireless link. One or more of the beacons take the role of service registration beacons and have a constrained broadcast range substantially within an indicated interaction zone at a respective registration point, whilst optionally other beacons are service delivery beacons having an unconstrained broadcast range. The service registration beacons are able to communicate with a portable device wirelessly when the device is positioned within the beacon's respective interaction zone, with the device providing an identifier to the network of beacons via the registration beacon when brought within the interaction zone of a registration beacon to signify consensual registration for services, said services being delivered by the data delivery beacons upon detection of such a registered portable device within the unconstrained broadcast range of a data delivery beacon. Hence, the user is able to move through a network or infrastructure of beacons in a shopping mall or an airport for example, without being pestered by unsolicited pushed services. Such services will only be delivered to the user's portable device if the user consented to data delivery by previously registering interest within an indicated interaction zone.

In accordance with the present invention there is provided a beacon having a broadcast range constrained substantially within an indicated interaction zone, for use with the systems or infrastructure described above.

In accordance with the present invention there is also provided a method for enabling a user of a portable device to perform service interaction with a communications system, the system comprising a service interaction beacon operable to broadcast services wirelessly over a broadcast range, wherein the broadcast range of the beacon is constrained and indicated as an interaction zone to a user of a portable device; the beacon broadcasts services wirelessly over said indicated interaction zone; the user's portable device detects said broadcasts and enables service interaction when positioned within said indicated interaction zone.

Additionally, a plurality of different service interactions between the portable device and the beacon may be supported by the method, and the step of enabling service interaction comprises exchanging an identifier between the portable device and the beacon thereby registering said portable device for registration to one or more of said service interactions.

The method may further comprise the step of making available to a user a menu of the different service interactions available from which menu the user selection for registration may be made.

Further features and advantages of the present invention are recited in the attached claims, the disclosure of which is incorporated herein by reference, and to which the reader is now directed.

BRIEF DESCRIPTION OF DRAWINGS

Preferred embodiments of the invention will now be described, by way of example only, and with reference to the accompanying drawings, in which.

DETAILED DESCRIPTION

In the following description we consider particularly a CA application which utilises Bluetooth protocols for communication of messages from beacon to portable device (whether telephone, PDA or other device such as a radio enabled smart card or those devices known to those skilled in the art as "RF tags" or "smart labels"). As will be recognised, the invention is not restricted to Bluetooth devices, and is applicable to other communications arrangements, in particular (although not exclusively) frequency hopping systems.

Figure 1:
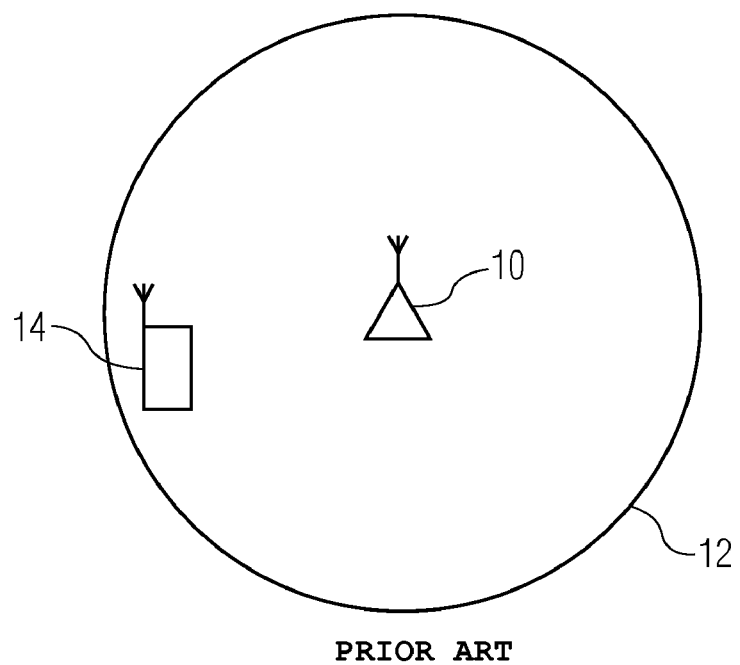
FIG. 1 is a schematic diagram of a beacon having an unconstrained and non-indicated range and a portable device.

FIG. 1 is a schematic diagram of a low power base station or beacon 10 having an unconstrained (as defined above) and non-indicated broadcast range 12 as is normally found in systems such as that described in assigned United Kingdom patent application no. 0113629.0 entitled 'Consensual Data Delivery Through Beacons' (Agents Ref. PHGB010086). FIG. 1 also shows a CA portable device such as a mobile telephone or PDA 14, shown in the Figure within the broadcast range 12 of the beacon. The wireless broadcast range 12, represented as a circle in FIG. 1, is not of course visible to the owner or user of the portable device 14, and therefore it is not outwardly obvious to the user where he/she must be to interact or not interact with the beacon 10. In this example, the CA terminal 14 is just within the broadcast range 12, and therefore the user may receive unsolicited or pushed service offers, adverts and the like on their CA terminal 14 from the beacon 10.

Figure 2:
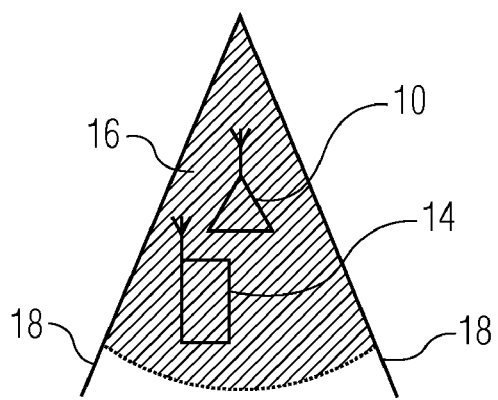
FIG. 2 is a diagram representing a portable device and a beacon within a walk-in booth.

FIG. 2 is a schematic view of a beacon device 10 enclosed on two sides by EMI (Electromagnetic Interference) shielding panels 18, forming a booth about the beacon 10. Those skilled in the art of reducing EMI will recognise that such shielding panels can be obtained in numerous ways, for example U.S. Pat. No. 4,585,901 describes the preparation of such panels by vapour depositing metal layers onto a panel substrate, and also describes painting panels with Nickel-acrylic paint. Alternatively, aluminium flake or powder fillers embedded within plastic panels, the use of carbon mats and wire grids and other techniques are known to those skilled in the art. Such panels or screens may be assembled in any suitable configuration about the beacon to constrain the broadcast range. In FIG. 2, the beacon 10 has a natural broadcast range substantially constrained on two sides by the panels 18 and which does not extend beyond the limit of the panels, thereby forming a roughly triangular booth, the floor of which is coloured to indicate the extent of this region. Hence, an interaction zone 16 is indicated to the user, being defined by the configuration of the screens 18 and the marking of the interior floor surface of such screens. A portable device 14 must be within this indicated interaction zone 16 to enable service interaction with the beacon 10.

Figure 3:
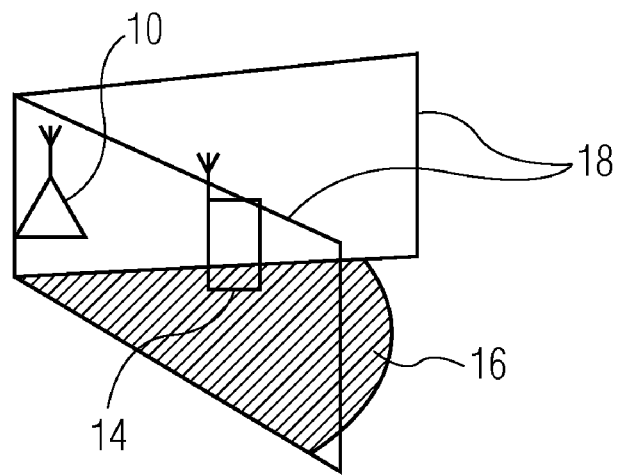
FIG. 3 is a side-view representation of the system and booth of FIG. 2.

FIG. 3 is a side view of the booth arrangement of FIG. 2, in which the marked floor of the booth acting as an indicated interaction zone 16 for the user is clearly shown. Other configurations and combinations of shielding panels or structures about the beacon are possible, for example the use of suitable shielding enables the construction of side-by-side service registration booths, or service access walk-through areas which may be located near the entranceway to a shopping mail or other public place.

The beacon 10 may also advantageously be combined with a directional antenna to constrain the broadcast range. A directional antenna such as a rectangular microstrip patch antenna having a sidelength of several centimeters creates a broadcast beamwidth Bw, that is roughly given by the equation:

$$Bw = 55 * \text{wavelength/sidelength} \qquad \text{Equ (1)}$$

Figure 4:
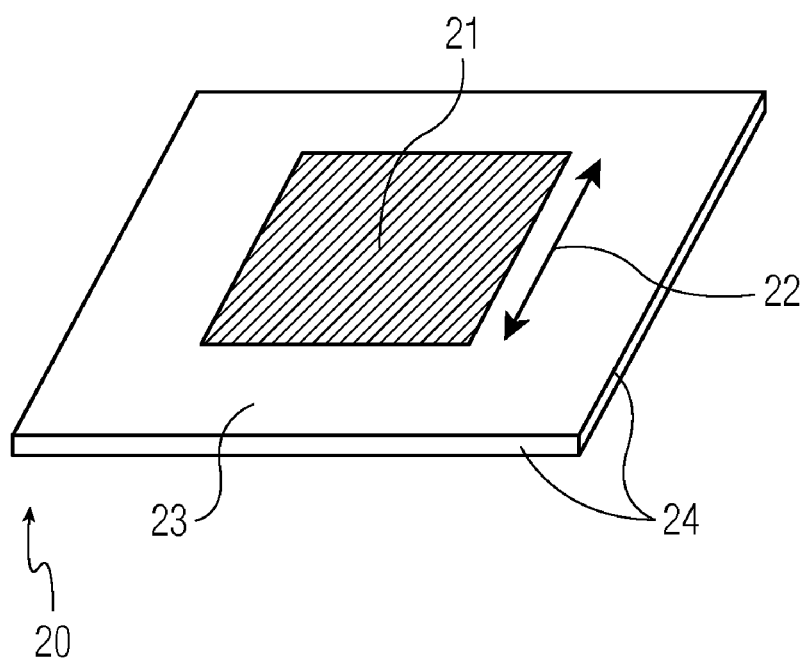
FIG. 4 shows an example of a printed directional antenna.

FIG. 4 shows a microstrip patch antenna 20 having a strip conductor 21 of sidelength 22 mounted on a dielectric substrate 23 provided with a groundplane 24. Application of Equation (1) to the antenna 20 having a sidelength 22 of twelve centimeters operating in the 2.4 GHz Bluetooth radio band, reveals a 55° beamwidth. Hence an antenna of twelve centimeters sidelength constrains the angle over which a Bluetooth radio beacon would otherwise broadcast considerably. In an embodiment using such an antenna, a beacon having a broadcast range of 10 cm or so is wall mounted with the aforementioned antenna to form an interaction zone extending only a few centimeters outward from the antenna with the area of the interaction zone corresponding chiefly to the area of the antenna due to the reduced beamwidth and indicated as such. To interact with the beacon, a portable device must be placed in close proximity with the antenna (i.e. within the bounds of the indicated interaction zone and just in front of or on the wall) to interact with the narrow beamwidth transmissions of the system. This configuration lends itself well to a "swipe" system, wherein in practical terms the user swipes their phone across the indicated interaction zone on the wall to interact with the beacon.

The use of shielding and directional antennas to severely constrain and indicate the interaction zone of a beacon provides system designers with much freedom. For example, FIG. 5 illustrates a registration terminal 24, wherein the embedded beacon and printed antenna are located underneath the shaped recess 26, the recess 26 and shaded region 28 serving as an indicated interaction zone 16 into which the user's portable device must be placed in order to register for a service.

Figure 5:
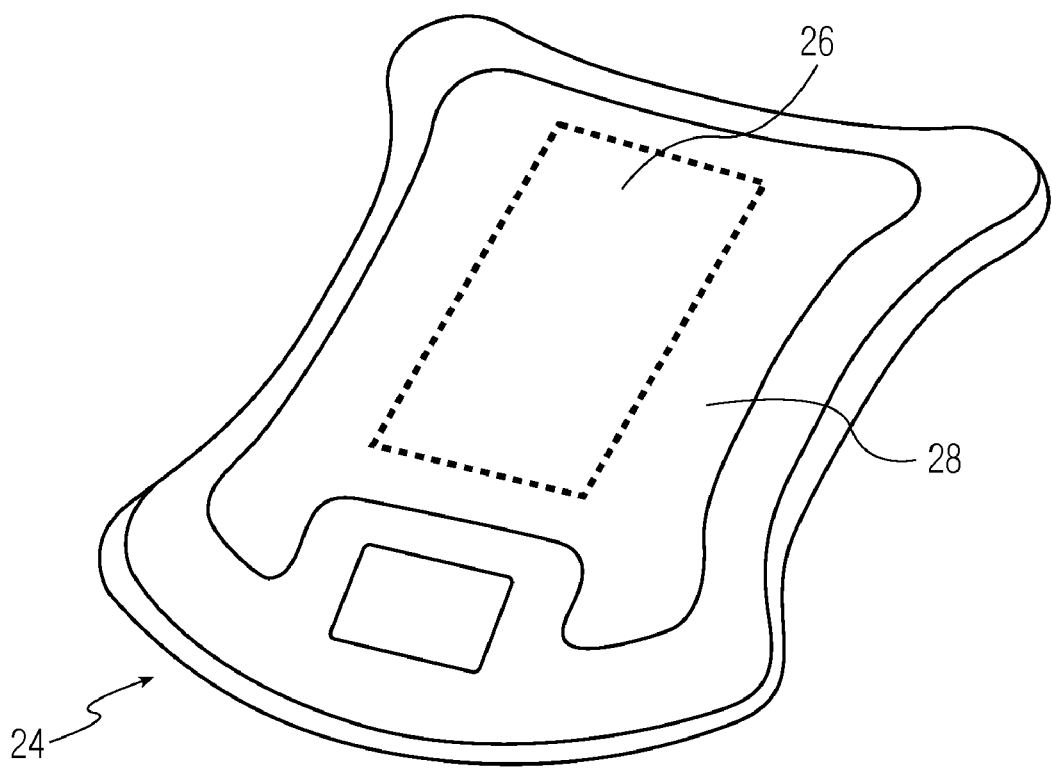
FIG. 5 illustrates a registration terminal embodying the invention.

Such registration terminals 24 as shown in FIG. 5 are preferably utilised as part of an infrastructure or network of beacons, some of which are unconstrained in their broadcast range and configured to deliver services to portable devices detected and identified as having been previously registered with such a terminal for service. In the following example, a network of interconnected radio beacons within a shopping mall are described, although it should be recognised by the skilled man that such networks are not limited to specific scenarios or applications involving a shopping mall, and may equally apply within a hotel, airports, internet cafés, museums and other places of public interest and commerce.

Figure 6:
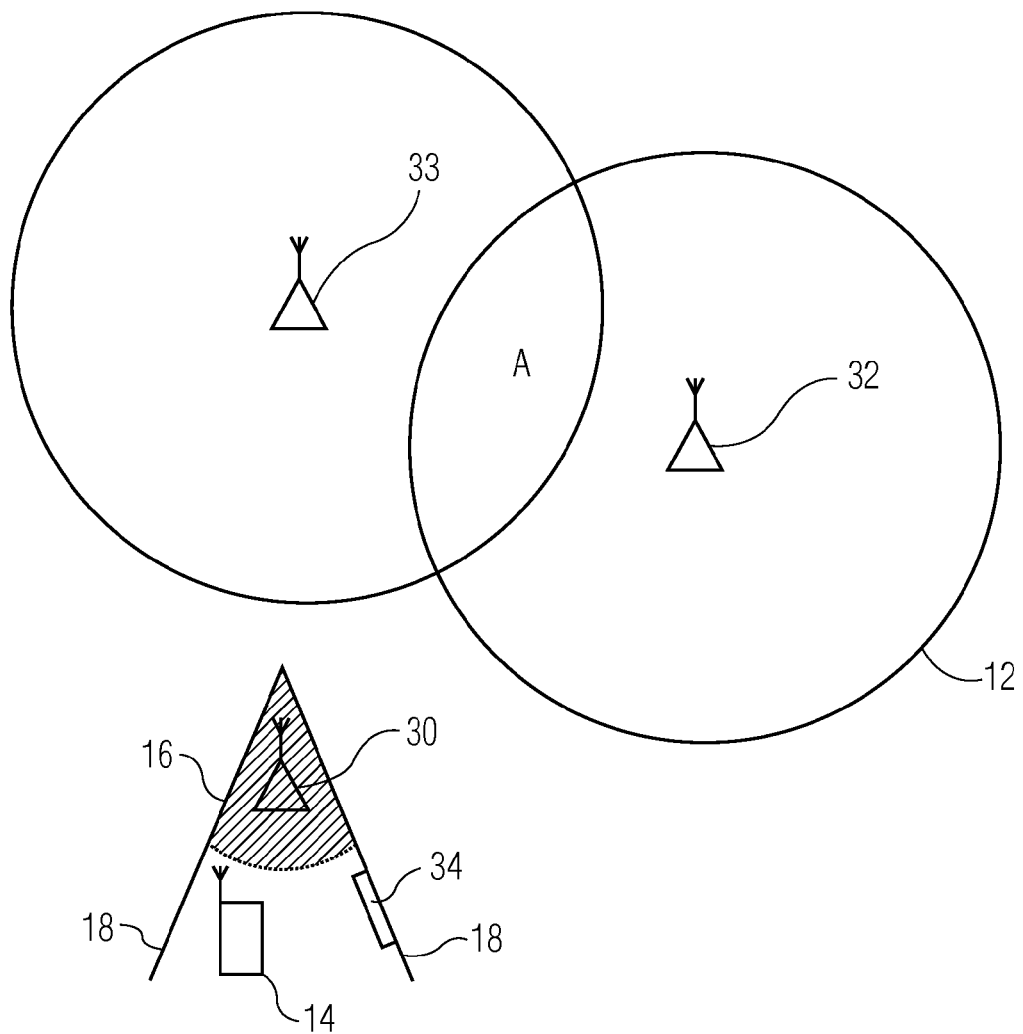
FIG. 6 is a diagram representing a network of beacons in a shopping mall.

FIG. 6 is a block schematic diagram of a CA mobile telephone 14 in use with a system of interconnected low power, short range base stations or beacons 30, 32, 33. The beacon 30 has a short and constrained broadcast range within an indicated interaction zone 16, and in this example serves as a registration beacon within shielding booth sidewalls 18. The beacons 32 and 33 have an unconstrained broadcast range and perform the role of service delivery beacons. It will be appreciated that for the sake of clarity, only one registration and two delivery beacons are illustrated, although the system will work equally well with many such interconnected beacons arranged in a network. Such an arrangement may be used in places like shopping malls to provide location-specific information such as local maps, information on nearby shops and restaurants and so on, with a beacon downloading information keys to a mobile device. An information key is a small data object that provides a registration reference to a source of full information, and it is in the form of a number of predetermined fields, one of which will contain a short piece of descriptive text presented to a user. Another field will be a pointer or address of some form, for example a URL for a webpage or telephone number. Other supplementary fields may control how the data is presented to a user and how the address may be exploited. A registration beacon 30 will generally broadcast cyclically a number of these keys, each typically relating to a different service. To receive a registration key, the user must first bring the CA terminal (telephone 14) into the interaction zone 16 of the beacon 30. The beacon, operating in an inquiry mode broadcasts an inquiry in the form of a short key to any CA terminal within the interaction zone 16.

The telephone 14, if within range, responds to the inquiry key by sending an identifier for itself to the beacon 30, which then begins an interaction with the portable device 14. For example, a terminal screen 34 in the booth of the registration beacon may offer different services to the user via a menu system, and the user may select a service on screen and then register for the service by moving their phone through (swiping) or placing their phone within the interaction zone 16. The registration beacon 30 then transfers the registration and portable device identifier data to the delivery beacon offering the selected service, for example beacon 32, via a secure transmission link which connects the beacons together. This link will typically be part of the fixed system of beacon infrastructure, and may simply comprise cabling or other conventional communication linking means.

The data delivery beacon 32 is now aware of the registered portable device via the identifier and registration data and hence can deliver the required registered services to the portable device 14 when it is detected by the beacon 32 within the data delivery broadcast range 12, whilst it will ignore any portable devices within broadcast range if their device identifiers or registration keys are unknown (i.e. weren't previously registered at beacon 30).

Furthermore, should the user, carrying their portable device, walk into or through an area of overlapping delivery broadcast ranges, such as that indicated at position A in FIG. 6, then only beacon 32 will deliver services to the (known) portable device, and beacon 33, although within range and able to detect the portable device, will not interact since the user's portable device was only registered for services deliverable by beacon 32, and therefore the portable device identifier was not provided to beacon 33. Hence, consensual push of services is enabled within a network of beacons.

The arrangement of such a network of interconnected beacons cooperating with a portable device are described in greater detail in the commonly-assigned UK Patent Application no. 0020101.2 entitled "Local Data Delivery Through Beacons", the disclosure of which is incorporated herein by reference and the relevant features of which are recited below.

The present invention adds to the Inquirer (registration) and Interactor (service delivery/interaction) radio beacon arrangement (preferably operating according to the Bluetooth Protocol) as disclosed within the aforementioned patent application the concept of using at least one radio beacon having a constrained range which is highlighted to a user as an indicated interaction zone thereby enabling simple consensual registration to receive services (information, alerts, etc.).

The user's required services or service categories are selected at registration (inquirer) beacon(s) causing the transmission of the user's Bluetooth device ID (the portable device identifier) to the relevant beacons in the network. If those are data delivery or Interactor radio beacons, then the interaction can be immediate once the portable device is within range of such beacons using the registered Bluetooth device ID.

Alternatively, the subsequent pushed signals of local information, commercial or social opportunity, once the user has consented by their Bluetooth 'swipe' in the indicated interaction zone, may be delivered to the mobile not via any Bluetooth beacon, but instead via SMS, WAP or other wide-area network means (for example, those operating according to the IEEE802.11 family of standards). In such a case the system suitably correlates the mobiles' Bluetooth device ID's with their wide-area network addresses (phone nos.).

Multiple data delivery or interactor beacons can be associated with one registration or inquiry beacon allowing location-specific content to be sent to the client (portable device). As before, the inquirer passes the identities of registered clients to all relevant interactors in the network. This means that, while a client remains in range of the network, it will only ever have to go through the registration process once.

Once the interactors know the identities of the clients, these can then begin the task of performing the service interaction or data delivery. They can all page all clients continuously. When a client walks within range of one data delivery beacon, it will respond to the page by setting up a link with that data delivery beacon. The other data delivery beacons will typically cease paging for that portable device ID until the link is cleared. More advanced paging schemes will page only in nearby cells on the grounds that the user will have to walk through one or more of them before he can reach cells located further away. In this way, large systems can page in economical fashion. Other paging strategies are also possible.

To provide for de-registration from the system, a beacon booth may be provided at the entrances/exit to the shopping mall to again detect a portable device once a user brings the device into the indicated interaction zone, and remove its registration from the system.

In the aforementioned embodiments, certain combinations of EMI shielding, short range beacons, beacons with adjustable broadcast ranges and directional antenna's are disclosed to constrain the range of a beacon, whilst the environment around the beacon(s) is suitably shaped, marked or highlighted to indicate the constrained range as an interaction zone to the user.

Many other combinations will be apparent to those persons skilled in the art without departing from the spirit and scope of this invention, for example skilful use of lighting about a constrained range beacon may serve to indicate the interaction zone to a user in a complex and eye catching way.

From reading the present disclosure, other modifications will be apparent to persons skilled in the art. Such modifications may involve other features which are already known in the design, manufacture and use of fixed and portable communications systems, and systems and components for incorporation therein and which may be used instead of or in addition to features already described herein.

The invention claimed is:

1. A communications system comprising:
a registration beacon device that is configured to provide interactive services, the beacon device capable of transmitting wireless transmissions according to a communications protocol over a broadcast range, and
at least one portable device capable of receiving the transmissions according to the protocol, wherein:
a broadcast range of the registration beacon device is constrained substantially within an interaction zone that includes visual or physical indication to identify limits of the interaction zone to a user of the portable device, wherein:
the transmissions include service registration offers to receive additional information from at least one data delivery beacon device, the service registration offers being communicated to the user when the portable device is located within the indicated interaction zone, and
the registration beacon device is configured to receive one or more inputs from the user to selectively accept one or more of the service registration offers.

2. The system as claimed in claim 1, wherein the broadcast range is constrained by electromagnetic shielding within, or at the boundaries of, the interaction zone.

3. The system as claimed in claim 1, wherein the registration beacon device has an adjustable broadcast range that is adjusted to provide a constrained range substantially within the interaction zone.

4. The system as claimed in claim 1, comprising at least one directional antenna to constrain the broadcast range substantially in at least one direction within the interaction zone.

5. The system as claimed in claim 1, wherein the broadcast range is constrained by electromagnetic shielding within, or at the boundaries of, the interaction zone, the registration beacon device further comprising at least one directional antenna to constrain the broadcast range substantially in the interaction zone based on an orientation of the directional antenna.

6. The system as claimed in claim 1, wherein the interaction zone comprises a portion of a walkway that is colored to identify the limits of the interaction zone.

7. The system as claimed in claim 1, wherein the interaction zone comprises a kiosk or booth, at least one of walls and floor of the kiosk or booth being colored to identify the limits of the interaction zone.

8. The system as claimed in claim 7, wherein the indication comprises a surface within the kiosk or booth, the surface shaped or visually labeled to indicate the interaction zone and where in use, the portable device is placed on, or moved across the surface to interact with the beacon device.

9. The system as claimed in claim 1, wherein the indication comprises an audible alert.

10. The system as claimed in claim 1, wherein the registration beacon device is configured for infrared communications and the transmissions conform to a predetermined infrared protocol.

11. The system as claimed in claim 1, wherein the registration beacon device is configured for radio communications and the transmissions conform to a predetermined radio protocol.

12. The system as claimed in claim 1, further comprising: the at least one data delivery beacon device operable to deliver information wirelessly to the portable device over a delivery broadcast range, wherein delivery of services to the portable device requires prior registration of the portable device within the interaction zone and wherein the delivery of services is triggered by detection of the portable device within the delivery broadcast range.

13. The system as claimed in claim 12, wherein the portable device accepts the registration offers by transmitting a portable device identifier to the registration beacon device following receipt of the transmissions, and wherein the data delivery beacon device receives the portable device identifier from the registration beacon device, and wherein the delivery of the services is triggered by the detection of the portable device having a matching portable device identifier.

14. The system of claim 13, including a plurality of the data delivery beacon devices, at least one of which has a constrained broadcast range substantially within a corresponding indicated interaction zone.

15. The registration beacon device for use with the communication system of claim 1, the registration beacon device having a broadcast range constrained substantially within an indicated interaction zone, wherein the registration beacon device provides at least one information key to the portable device within the interaction zone, the information key enabling the portable device to receive additional information associated with the provided information keys.

16. A method for enabling a user of a portable device to perform service interaction with a communications system, the system comprising a registration beacon device operable to broadcast services wirelessly over a broadcast range, wherein the broadcast range of the registration beacon device is constrained and visually or physically indicated as an interaction zone to a user of a portable device, the method comprising:
broadcasting, by the registration beacon device, offering services wirelessly over the indicated interaction zone;
receiving the broadcasts at the user's portable device when positioned within the indicated interaction zone and
making available a menu of different offering service interactions available from which the user selection for registration may be made, wherein the registration beacon device provides at least enabling the portable device to receive additional information associated with provided information keys.

17. The method as claimed in claim 16 further comprising: exchanging an identifier between the portable device and the registration beacon device thereby registering the portable device for registration to one or more of the service interactions.

18. A registration beacon device comprising:
a wireless transceiver that is configured to provide communication with a portable device via wireless transmissions when the portable device is located within an interaction zone that is identified by one or more visual or physical indications, and
a communications interface that is configured to facilitate communication with a plurality of data delivery beacon devices,
wherein the registration beacon device is configured to:
communicate at least one registration offer to a user of the portable device, the registration offer corresponding to an offer to receive communications from one or more of the plurality of data delivery beacon devices,
receive an identifier of the portable device when the portable device is within the interactive zone, and
providing the identifier of the portable device to one or more of the data delivery beacon devices corresponding to the registration offer.

19. The registration beacon device of claim 18, wherein the registration beacon device is configured to:
receive a notification that the portable device has departed an area associated with the data delivery beacon devices, and
notify the one or more data delivery beacon devices corresponding to the registration offer that the portable device has departed the area.

20. The registration beacon device of claim 18, wherein the transceiver has an adjustable broadcast range that is adjusted to provide a constrained range substantially within the interaction zone.

21. The registration beacon device of claim 18, wherein the registration beacon device is configured to provide a menu to the user to facilitate communicating a plurality of data delivery offers to the user and receiving the one or more inputs from the user.

* * * * *